United States Patent [19]

Shibahara

[11] Patent Number: 5,075,780
[45] Date of Patent: Dec. 24, 1991

[54] METHOD OF REPRODUCING GRADATIONS ACCORDING TO A RATIO OF FINE PIXELS TURNED ON TO FINE PIXELS TURNED OFF

[75] Inventor: Kenji Shibahara, Amagasaki, Japan

[73] Assignee: Mita Industrial Co., Ltd., Osaka, Japan

[21] Appl. No.: 497,566

[22] Filed: Mar. 22, 1990

[30] Foreign Application Priority Data

Mar. 29, 1989 [JP] Japan ................................. 1-79187
Mar. 29, 1989 [JP] Japan ................................. 1-79189
Mar. 29, 1989 [JP] Japan ................................. 1-79190

[51] Int. Cl.$^5$ ............................................. H04N 1/23
[52] U.S. Cl. ..................................... 358/298; 358/459
[58] Field of Search ................ 358/75, 298, 300, 429, 358/455, 456, 459

[56] References Cited

U.S. PATENT DOCUMENTS 4,531,160 7/1985 Ehn .
4,814,886 3/1989 Kuge et al. ......................... 358/298
4,924,301 5/1990 Surbrook ........................... 358/456

FOREIGN PATENT DOCUMENTS 214662 9/1986 Japan .
214665 9/1986 Japan .

Primary Examiner—Benjamin R. Fuller
Assistant Examiner—Scott A. Rogers
Attorney, Agent, or Firm—Beveridge, DeGrandi & Weilacher

[57] ABSTRACT

Disclosed is a method of reproducing gradations wherein a reference matrix pattern is configured by arranging a plurality of unit pixels like a matrix, each unit pixel is formed with a predetermined plurality of fine pixels, the fine pixels in number according to the gradations of an image signal are turned on, and the gradations are reproduced in accordance with the ratio of the fine pixels turned on to the fine pixels turned off in the reference matrix pattern, comprising steps of choosing the fine pixel to become a kernel, sequentially and alternatively growing the fine pixels adjacent to both sides of the fine pixel of the kernel therearound, and assigning serial ranks according to density of the image signal until all the fine pixels in the unit pixel are turned on at the region in which the image signal has the high density.

6 Claims, 12 Drawing Sheets

Fig. 3

| 57 | 41 | 25 | 9 | 1 | 17 | 33 | 49 | 59 | 43 | 27 | 11 | 3 | 19 | 35 | 51 |
|---|---|---|---|---|---|---|---|---|---|---|---|---|---|---|---|
| 7 | 23 | 39 | 55 | 61 | 45 | 29 | 13 | 5 | 21 | 37 | 53 | 63 | 47 | 31 | 15 |
| 60 | 44 | 28 | 12 | 4 | 20 | 36 | 52 | 58 | 42 | 26 | 10 | 2 | 18 | 34 | 50 |
| 6 | 22 | 38 | 54 | 64 | 48 | 32 | 16 | 8 | 24 | 40 | 56 | 62 | 46 | 30 | 14 |

Fig. 4
(PRIOR ART)

| 35 | 43 | 51 | 59 | 1 | 9 | 17 | 25 | 33 | 41 | 49 | 57 | 3 | 11 | 19 | 27 |
|---|---|---|---|---|---|---|---|---|---|---|---|---|---|---|---|
| 7 | 15 | 23 | 31 | 39 | 47 | 55 | 63 | 5 | 13 | 21 | 29 | 37 | 45 | 53 | 61 |
| 34 | 42 | 50 | 58 | 4 | 12 | 20 | 28 | 36 | 44 | 52 | 60 | 2 | 10 | 18 | 26 |
| 6 | 14 | 22 | 30 | 38 | 46 | 54 | 62 | 8 | 16 | 24 | 32 | 40 | 48 | 56 | 64 |

DOCUMENT

OUTPUT PATTERN AS PWM

AFFECTED BY BLEEDING
OR SPREADING

OUTPUT PATTERN BY
CONTROLLING LIGHT QUANTITY

DOCUMENT

| 1 | 17 | 33 | 49 | 9 | 25 | 41 | 57 | 3 | 19 | 35 | 51 | 11 | 27 | 43 | 59 |
|---|---|---|---|---|---|---|---|---|---|---|---|---|---|---|---|
| 13 | 29 | 45 | 61 | 5 | 21 | 37 | 53 | 15 | 31 | 47 | 63 | 7 | 23 | 39 | 55 |
| 4 | 20 | 36 | 52 | 12 | 28 | 44 | 60 | 2 | 18 | 34 | 50 | 10 | 26 | 42 | 58 |
| 16 | 32 | 48 | 64 | 8 | 24 | 40 | 56 | 14 | 30 | 46 | 62 | 6 | 22 | 38 | 54 |

Fig. 9A
|   |   |   |   |   |   | 19 | 58 |
|---|---|---|---|---|---|----|----|
|   |   |   |   |   | 19 | 58 | 19 |
|   |   |   |   | 19 | 58 | 19 |   |
|   |   |   | 19 | 58 | 19 |   |   |
|   |   | 19 | 58 | 19 |   |   |   |
|   | 19 | 58 | 19 |   |   |   |   |
| 19 | 58 | 19 |   |   |   |   |   |
| 58 | 19 |   |   |   |   |   |   |
Fig. 9B
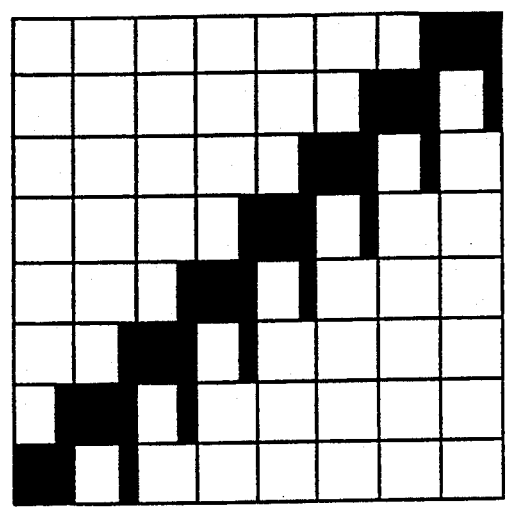
Fig. 9C
|   |   |   |   |   | 19 | 58 | 19 |
|---|---|---|---|---|----|----|----|
|   |   |   |   | 19 | 58 | 19 |   |
|   |   |   | 19 | 58 | 19 |   |   |
|   |   | 19 | 58 | 19 |   |   |   |
|   | 19 | 58 | 19 |   |   |   |   |
| 19 | 58 | 19 |   |   |   |   |   |
| 58 | 19 |   |   |   |   |   |   |
| 19 |   |   |   |   |   |   |   |
Fig. 9D
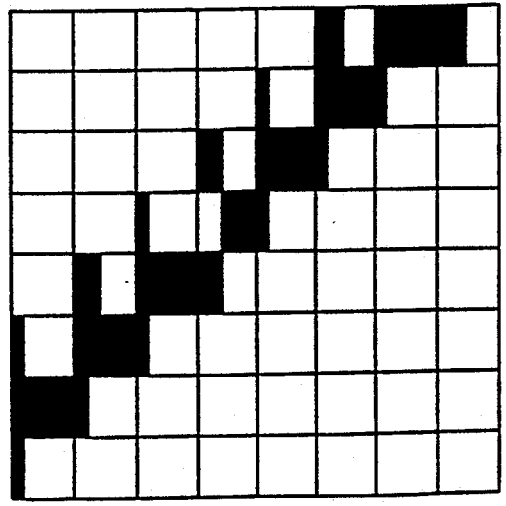

Fig. 13A
(PRIOR ART)
|   |   |   |   | 10 | 30 |
|---|---|---|---|----|----|
|   |   |   | 10 | 30 | 10 |
|   |   | 10 | 30 | 10 |    |
|   | 10 | 30 | 10 |   |    |
| 10 | 30 | 10 |   |   |    |
| 30 | 10 |   |   |   |    |
Fig. 13B
(PRIOR ART)
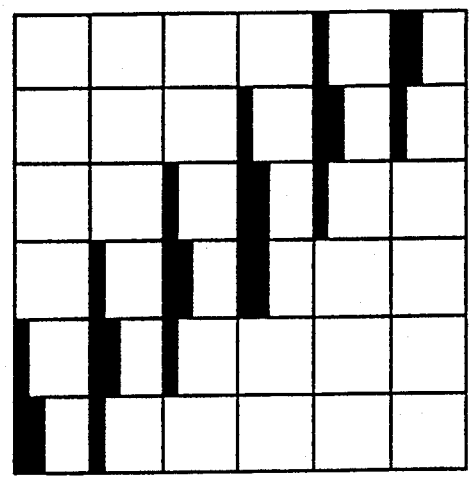
Fig. 13C
(PRIOR ART)
|   |   |   | 10 | 30 | 10 |
|---|---|---|----|----|----|
|   |   | 10 | 30 | 10 |   |
|   | 10 | 30 | 10 |   |   |
| 10 | 30 | 10 |   |   |   |
| 30 | 10 |   |   |   |   |
| 10 |   |   |   |   |   |
Fig. 13D
(PRIOR ART)
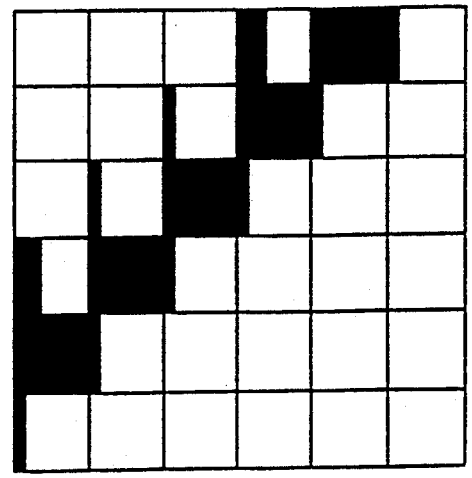

METHOD OF REPRODUCING GRADATIONS ACCORDING TO A RATIO OF FINE PIXELS TURNED ON TO FINE PIXELS TURNED OFF

BACKGROUND OF THE INVENTION

The present invention relates to a method of reproducing gradated images such as half-tone images or the like.

There are generally known a dither method and a density pattern method as a method of reproducing the gradations of image information. In these methods, a reference matrix pattern is formed by (n×m) unit pixels, a predetermined ones of the (n×m) unit pixels, which are included in the reference matrix pattern, are turned on (for example turned to "black") according to density of the given image information, and the density is represented in accordance with the ratio of the unit pixels turned on in the reference matrix pattern (for example black regions) and the ratio of the unit pixels turned off (for example white regions) and thereby the gradations are reproduced.

By way of example, if a 3×3 reference matrix pattern is used, the (3×3+1=10) gradations can be reproduced. If a 4×4 reference matrix pattern is used, (4×4+1=17) gradations can be reproduced.

When the gradations are reproduced using the dither method or the density pattern method, it is important the gradation reproducing capability and resolution are contrary to each other. Namely, if it is desirable to increase the number of gradations, the number of unit pixels in the reference matrix pattern should be increased. However, the reference matrix pattern is thereby made larger and thus the resolution of images is deteriorated.

To eliminate the defect above-mentioned, i.e. to increase the number of gradations and not to deteriorate the resolution, a method is executed wherein each pixel, which configures the reference matrix pattern, is further divided into fine pixels to make a group thereof and the fine pixels are gradually grown, that is, the number of fine pixels turned on are gradually increased and thereby the gradations are reproduced.

By way of example, in a laser beam printer, the unit pixel can be further divided into a plurality of fin pixels by controlling lighting time of a laser beam width modulation or controlling the quantity of light of the laser by light intensity modulation. In a LED printer, the fine pixels can be obtained by changing lighting pulse width or light intensity of a LED. Furthermore, in a liquid crystal printer, the fine pixels can be obtained by changing the pulse width of transmitted light or the quantity of the transmitted light.

Conventionally, there are two methods in case of reproducing the gradations with use of the fine pixels.

(1) In a first method, the thresholds are assigned so that the fine pixels may be grown in ranks shown in FIG. 11. Namely, each fine pixel in the unit pixels 101 with the reference matrix pattern is grown (the ranks, in which the unit pixels are turned on, are expressed by 1, 2, 3, 4 ... ). When the growth of all the fine pixels in the unit pixels 101 is terminated, the fine pixels in the unit pixels 102 adjacent to the right side of the unit pixels 101 are serially grown (See JP, A-214662/1986).

According to the threshold ranking of fine pixels above-mentioned, there is a following advantage.

In the case that the gradations are reproduced by using the fine pixels, a method of printing in an actual printing output may be unstable and thereby the gradations may not be faithfully reproduced. The size of the fine pixels may be easily unstable and the resolution of images is deteriorated, for example, due to bleeding and the like in the printer with the use of an ink-jet method or thermal transferring method, while due to spreading of toner and the like in the printer with the use of an electrophotographic method.

According to the threshold ranking of fine pixels above-mentioned, however, the fine pixels, which are arranged on a plurality of oblique lines L at regular intervals, are gradually grown with a plurality of reference matrix patterns arranged. The fine pixels are not first adapted to be grown in a position out of the oblique lines L. Accordingly, even if the method of printing becomes unstable, there is little possibility that the unit pixels, which are adjacent to each other, will be overlapped due to the bleeding, the spreading or the like.

There is a following defect in the threshold ranking, wherein all the fine pixels in the unit pixels 101 are first grown, thereby the entire unit pixels 101 are turned on and thereafter the fine pixels in the unit pixels 102 adjacent to the unit pixels 101 are serially grown as described above.

Since the fine pixels in the unit pixels are first grown, there is a good possiblity that the unit pixels, of which all the fine pixels are turned off (that is, white unit pixels), will appear. If there are a lot of unit pixels of which all the fine pixels are turned off, line drawing information on characters, fine lines or the like cannot be reproduced well. The unit pixels, of which all the fine pixels are turned off, become, for example, white dots. If there are a lot of white dots, the line drawings are interrupted therein. Therefore, it is difficult to read the characters, while it is impossible to precisely reproduced fine lines or the like.

(2) There has been proposed a second method of outputting images in JP, A-214665/1986, wherein the gradations can be more faithfully reproduced with use of the fine pixels. According to the method of outputting images as above-mentioned, the gradations are reproduced by distributedly growing the fine pixels in the reference matrix pattern at a low density region, while collectively growing a plurality of fine pixels at a high density region.

There will be more particularly discussed the method of outputting images with reference to FIG. 12A. In FIG. 12A, the reference matrix pattern is configured by (3×3=9) unit pixels. Each unit pixel is divided into five fine pixels.

In the case that the gradations are reproduced, each fine pixel is sequentially turned on from the lowest number (threshold) assigned thereto. If the gradations are heightened by one at the high density region, three fine pixels are simultaneously turned on.

According to the method of outputting images as above-mentioned, however, the number of gradations is theoretically decreased. The reason is that when the gradations are reproduced at the high density region, a plurality of fine pixels are collectively increased in accordance with the change of gradations.

In FIG. 12B, a pattern having 45 gradations is reproduced on the basis of the reference matrix pattern, to which the threshold ranks in FIG. 12A, are assigned. As seen from FIG. 12B, even if the number of gradations is theoretically 46, only 34 gradations can be reproduced in practice.

If the numbers of growing fine pixels are different at the high density region unlike the middle and low density regions each time the gradations are heightened by one, the reproduction of gradations is caused to be dependent upon an output device considerably. Therefore, the available output device is limited.

In the prior art above-mentioned, the threshold ranks may be partially assigned to each fine pixel in the unit pixels configuring the reference matrix pattern or the number of gradations may be different. Therefore, in the case that image data, which has a sudden change of gradations of line drawing information or the like, is reproduced, the reproducing efficiency cannot be obtained. Further, there is possibility that the reproduced images will be largely changed due to a method of applying the image information to the reference matrix pattern.

More specifically, if the positional relation between original picture data and the matrix pattern is such as to be shown in FIG. 13A, that is, the gradations of image data, which are given to each unit pixels in the matrix pattern, are expressed by numerical values as shown, the image pattern is reproduced as shown in FIG. 13B.

On the other hand, if the positional relation between the image data and the matrix pattern is such as to be shown in FIG. 13C, that is, the positions are shifted upwardly as compared to FIG. 13A, the image pattern is reproduced as shown in FIG. 13D.

As apparent from the comparison of the image pattern of FIG. 13B with that of FIG. 13D, if the method of outputting images above-mentioned is used, the image pattern to be reproduced is largely changed according to the positional relation between the image data and the pattern.

There has been also considered a method of distributedly increasing the number of fine pixels one by one according to the change of gradations even in the case that the gradations are reproduced at the high density region. According to the method above-mentioned, however, there are a lot of unit pixels, in which only one fine pixel turned off at the high density region remains, in the reference matrix pattern. Accordingly, the matrix pattern may be easily affected by the bleeding or spreading of toner or the like and thereby the gradations cannot be stably reproduced.

It is an object of the present invention to provide a method of reproducing gradations wherein a plurality of unit pixels configuring the reference matrix pattern are respectively formed with a plurality of fine pixels, and the gradations are reproduced in accordance with the ratio of the fine pixels turned on, so that the gradations can be faithfully reproduced according to the density of images and the higher resolution can be obtained.

It is another object of the present invention to provide a method of reproducing gradations wherein threshold ranking of the fine pixels is improved.

It is a further object of the present invention to provide a method of reproducing gradations wherein the number of gradiations is not theoretically decreased and the matrix pattern is seldom affected by the bleeding or spreading of toner or the like.

SUMMARY OF THE INVENTION

To achieve the object above-mentioned, a first invention (claim 1) provides a method comprising steps of:
selecting a predetermined unit pixels from a reference matrix pattern;
choosing fine pixels as kernels at the endmost of each unit pixel thus selected, respectively;
turning on fine pixels of the kernels in predetermined ranks according to density of image signals; and
alternately turning on the fine pixels adjacent to both sides of the fine pixel turned on in the predetermined ranks according to the density of image signals as the density of image signals becomes higher.

According to the method above-mentioned, since the fine pixel to become the kernel is adjacent to other unit pixels, the fine pixels in question are not grown only in the unit pixel. Around the fine pixel of the kernel, the fine pixels, which are adjacent to the both sides thereof, are sequentially and alternately grown. Namely, the fine pixels are ranked so that they may not be grown within the unit pixels but over two unit pixels.

By way of example, FIG. 1 shows that the fine pixels are gradually grown while spreading right and left around the fine pixels of the kernels having the threshold ranks '1' to '8'.

Accordingly, even in the case that the line drawings such as fine lines, characters or the like are included, the line drawings are seldom interrupted and therefore can be precisely reproduced.

By effectively utilizing the bleeding or spreading or printing medium generated by an output device for reproducing images, the claimed method of reproducing gradations, which is favorably affected by the bleeding or spreading, can be realized.

To achieve the object above-mentioned, a second invention (claim 5) provides a method comprising steps of:
distributedly assigning the ranks to turn on the fine pixels within the reference matrix pattern at a region in which the image signals have low density; and
assigning serial ranks in accordance with the density of the image signals to the fine pixels in predetermined unit pixels within the reference matrix pattern until all the fine pixels in the unit pixel in question are turned on at a region in which the image signals have the high density.

According to the method above-mentioned, the fine pixels turned on are distributedly grown and the gradations are reproduced without being affected by environment, at the low density region. The fine pixels turned on are grown adjacently to the fine pixels which have been already grown, at the high density region.

Accordingly, in the present invention, unlike the prior art, even if the gradations are heightened by one in the high density region, a plurality of fine pixels are not simultaneously turned on. Therefore, since the number of gradations is not theoretically decreased, the reproduction of gradations is not damaged and the half-tone images can be reproduced in rich gradations. Since the gradations are changed by one, the number of fine pixels is increased by one. Therefore, it is not required that the reproduction of gradations is largely dependent on the output device. Accordingly, a variety of output devices can be used.

Furthermore, at the high density region, all the fine pixels in the unit pixel in question are sequentially grown adjacently to the fine pixels which have been already grown, until they are turned off. Thereby, the state can be avoided, wherein a lot of unit pixels, of which fine pixels turned off are not more than a predetermined number (for example 1), remain in the reference matrix pattern.

If a certain fine pixel is turned off and others are turned on in the unit pixel, there is a good possibility that the fine pixel turned off may disappear due to the bleeding of toner and the like in the printing output. Then in the claimed invention, the unit pixels, in which the possible fine pixels remain, are decreased. Thereby, the gradations can be reproduced more precisely.

The gradation symmetry is maintained in each pixel. Therefore, even in case that there are included the line drawings such as fine lines, characters and the like, the information thereof can be precisely reproduced.

In the second invention above-mentioned, the serial ranks according to the density of image signals, may be assigned to the fine pixels in all the unit pixels within the reference matrix pattern until all of them are turned on, at the region in which the image signals have the high density (claim 6).

According to the manner above-mentioned, the serial ranks according to the density of image signals are assigned to the fine pixels in all the unit pixels within the reference matrix pattern until they are turned on. Therefore, it is possible to cause two or more unit pixels, in which one fine pixel is turned off, not to exist in the reference matrix pattern.

Therefore, the number of unit pixels, in which fine pixels turned off might disappear due to the bleeding of toner and the like in the printing output, can be kept to a minimum (1 unit pixel).

The above and other features of the present invention will be apparent in the following description with reference to the accompanying drawings.

BRIEF DESCRIPTION OF THE DRAWINGS

FIG. 3 is a view showing a threshold rank matrix pattern in relation to one embodiment of the present invention;

FIG. 4 is a view showing an example of the conventional threshold rank matrix pattern;

FIGS. 9A to 9D are views for explaining one of the advantages in case of using the threshold rank matrix pattern shown in FIG. 7A;

FIGS. 13A to 13D are views for explaining defects in the case of using the threshold rank matrix pattern shown in FIG. 12A.

DETAILED DESCRIPTION OF THE PREFERRED EMBODIMENTS

In the following embodiments, there will be discussed the case in which a laser beam printer is used as an image output device, and a reference matrix pattern is configured by (4×4) unit pixels and each unit pixel is divided into four fine pixels.

EMBODIMENT 1

Figure 2:
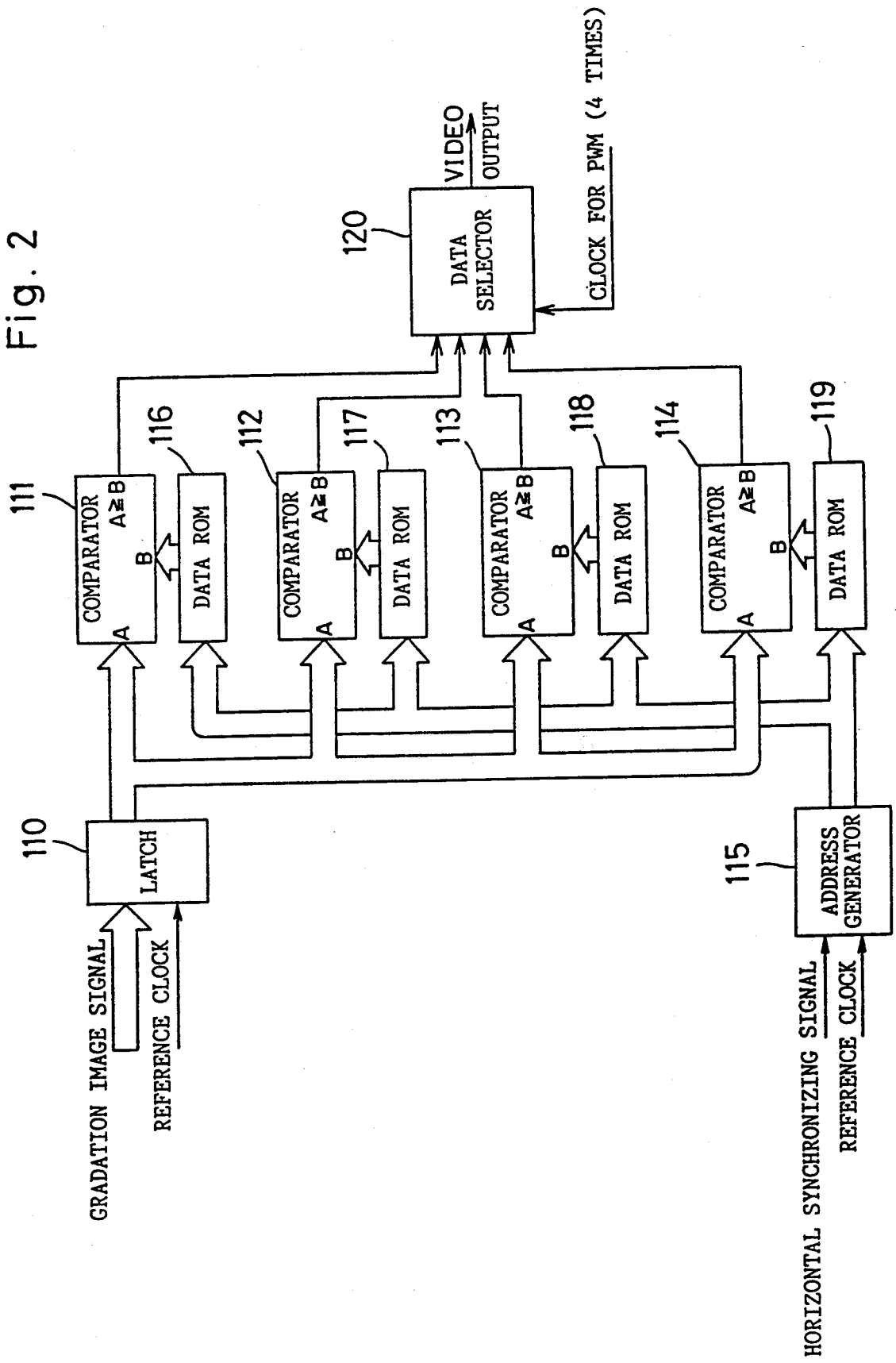
FIG. 2 is a block diagram showing a configuration of a basic circuit for producing dither image signals in relation to one embodiment of the present invention.

FIG. 2 is a block diagram showing an example of a basic configuration of a dither image signal output circuit by a dither method.

A gradation image signal is provided to a latch 110. In the latch 110, the gradation image signal is latched at, for example, leading edge of a reference clock. An output of a latch 110 is provided to each input terminal A of comparators 111, 112, 113 and 114.

On the other hand, a horizontal synchronizing signal of the gradation image signal and a reference clock are provided to an address generator 115. In the address generator 115, an address is generated on the basis of the horizontal synchronizing signal and the reference clock. The address is output to data ROMs 116, 117, 118 and 119. The ROMs 116, 117, 118 and 119 are respectively provided corresponding to the comparators 111, 112, 113 and 114 and prestore the threshold ranks by the dither method.

When the address is provided from the address generator 115, the threshold, which is stored in the address, is provided to each input terminal B of the corresponding comparators 111, 112, 113 and 114.

The comparators 111, 112, 113 and 114 compare the gradation of the gradation image signal provided to the input terminal A with the threshold provided to the input terminal B, respectively. If A≧B, that is, the gradation of the gradation image signal is more than the threshold, H level is output. If not, L level is output. The outputs of the comparators 111, 112, 113 and 114 are provided to a data selector 120 in parallel. The data selector 120 converts the signals provided in parallel into serial signals to output them as dither image signals outwardly in response to, for example, the leading edge of the clock for PWM (pulse width modulation), which is four times as much as the reference clock signal in frequency.

It is not necessarily required that the threshold is compared with the gradation image signal latched on the basis of the reference clock in the configuration above-mentioned. Other circuit configurations can be also used. While the data ROMs 116, 117, 118 and 119 are used in the present embodiment, the alternative configuration may be used wherein all the threshold ranks are stored in a single data ROM, the threshold ranks in question can be transferred to four RAMs, and the threshold ranks of the RAMs are provided to the corresponding comparators 111, 112, 113 and 114.

Further, the configuration may be used, wherein one comparator and one data ROM are provided, the threshold is output from the data ROM on the basis of the clock for PWM, and also the gradation of the gradation image signal is compared with the threshold on the basis of the clock for the PWM in the comparator.

FIG. 3 shows the state wherein the threshold ranks, which are stored in the data ROMs 116, 117, 118 and 119, are collected under one matrix pattern. The matrix pattern of threshold ranks shown in FIG. 3 corresponds to the reference matrix pattern configured by (4×4=16) unit pixels. The unit pixels having the fine pixels to become kernels and the unit pixels having no fine pixels to become kernels are adapted to be mutually positioned like checkers in the longitudinal and transverse directions. Further, each unit pixel is divided into four fine pixels. The threshold of each fine pixel is ranked according to the distributed pattern referred to as Bayertyped one.

The thresholds of the fine pixels on the left end of the unit pixels in the threshold rank matrix pattern are stored in the data ROM 116 shown in FIG. 2. The thresholds of the second fine pixels from the left in the unit pixels are stored in the data ROM 117. The thresholds of the third fine pixels from the left in the unit pixel are stored in the data ROM 118. The thresholds of the fine pixels on the right end of the unit pixels are stored in the data ROM 119.

FIG. 4 shows an example of the threshold rank matrix pattern in case of using the prior art.

The feature of the threshold rank matrix pattern in FIG. 3 is that the threshold ranks, which show the directions of growth of the fine pixels, are assigned in order of, for example, the fine pixel adjacent to the left side of the fine pixel to become kernels, the fine pixel adjacent to the right side thereof, the fine pixel adjacent to the left side thereof, the fine pixel adjacent to the right side thereof and the like so that the growth of other fine pixels may be expanded toward the right and left around the fine pixels to become the kernels.

In the prior art shown in FIG. 4, the fine pixel are first grown in the unit pixel having the fine pixel to become the kernel and thereafter the fine pixels are sequentially moved to the next unit pixels on the right side.

In a process of growth of the fine pixels, the present embodiment in FIG. 3 is just the same as the prior art in consideration of the ratio of the fine pixels turned on to the fine pixels turned off, that is, the ratio of a white area to a black area. However, the present embodiment is different from the prior art in the arrangement of the fine pixels turned on.

To make the features of the present embodiment clearer, there will be discussed two particular examples wherein the output reproduced with the use of the threshold rank matrix pattern shown in FIG. 3 is compared with the output reproduced with use of the threshold rank matrix pattern shown in FIG. 4.

Figure 5A:
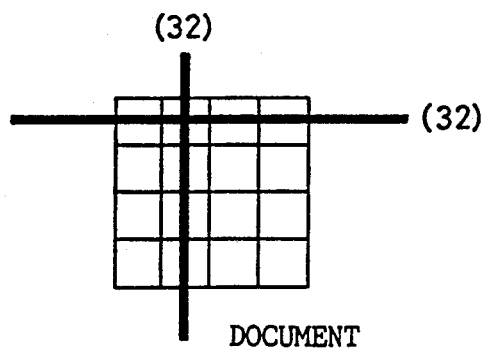
FIGS. 5A to 5G are particular examples for explaining the comparison of one embodiment of the present invention with the prior art.
Figure 5E:
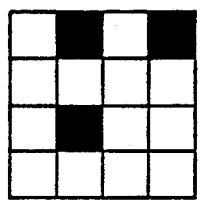
Figure 5B:
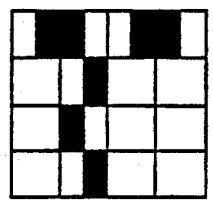
Figure 5F:
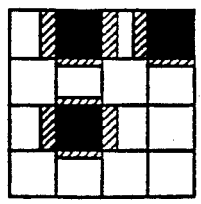

FIGS. 5A to 5G are first examples. FIG. 5A shows the positional relation between a document pattern, that is, a given gradation image and the reference matrix pattern. As shown, two fine lines, of which gradations are indicated by "32" and which extend in the longitudinal and transverse directions, are reproduced. If the fine lines are reproduced with use of the conventional threshold rank matrix pattern shown in FIG. 4, the output pattern in FIG. 5E is obtained. If images are actually transferred to papers or the like by a laser beam printer, the images are affected by the bleeding or spreading of toner or the like as shown in FIG. 5F.

Figure 5C:
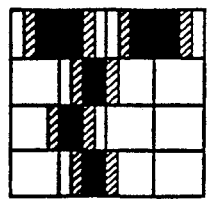

On the other hand, if the threshold rank matrix pattern in accordance with the present embodiment is used, all the fine pixels having thresholds equal to or less than "32" in the unit pixel, to which the fine lines having the gradation of "32" correspond, are turned on, and thereby the output pattern in FIG. 5B is reproduced. If the output pattern thus reproduced is actually transferred to the paper by the laser beam printer, the images are affected by the bleeding or spreading of toner or the like as shown in FIG. 5C. By the comparison of the images in FIGS. 5C and 5F with a document in FIG. 5A, it is clear that the document can be more faithfully reproduced with use of the present embodiment.

Also, the bleeding or spreading of toner or the like is useful in reproducing the document faithfully.

Figure 5G:
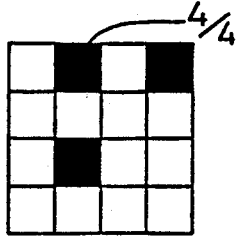
Figure 5D:
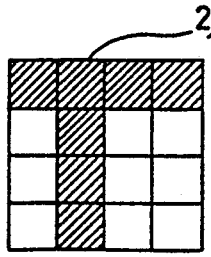

In the above description, a method of dividing each unit pixel into the fine pixels by the PWM for controlling the lighting time of a laser in the laser beam printer. In case of intensity modulation for changing the quantity of light of the laser, the output pattern of the image reproduction in FIG. 5D is obtained with use of the threshold rank matrix pattern in accordance with the present embodiment. In the case that the conventional threshold rank matrix pattern is used, the output pattern in FIG. 5G is obtained similar to the PWM.

Figure 6A:
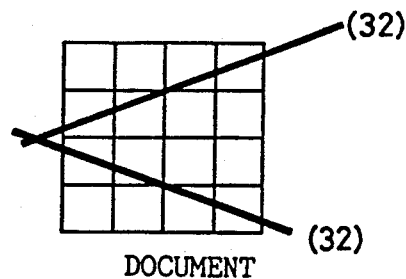
FIGS. 6A to 6G are particular examples for explaining the comparison of one embodiment of the present invention with the prior art.
Figure 6E:
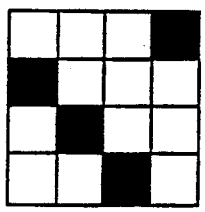
Figure 6B:
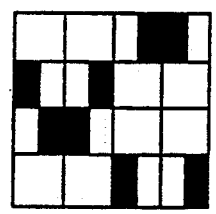
Figure 6F:
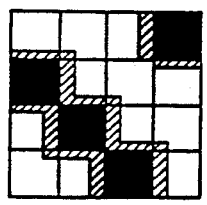
Figure 6C:
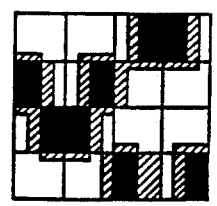

FIGS. 6A to 6G are second examples. In FIG. 6A, the document in two fine lines of which gradations are "32", and the fine lines are positioned obliquely to a direction of an arrangement of the reference matrix pattern. In the case of using the present embodiment, the pattern reproduced by the PWM is obtained as shown in FIG. 6B, and the reproduced image is actually affected by the bleeding or spreading of toner or the like as shown in FIG. 6C.

Figure 6G:
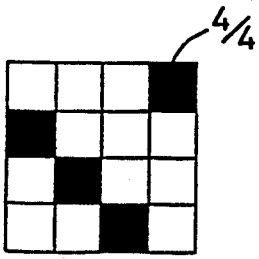
Figure 6D:
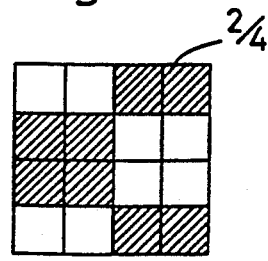

On the other hand, in the case of using the conventional threshold rank matrix pattern, the pattern reproduced by the PWM is obtained are shown in FIG. 6E, and the transferred image is actually obtained as shown in FIG. 6F. Moreover, according to the control of the quantity of light by the intensity modulation, if the present embodiment is used, the output pattern in FIG. 6D is obtained, while if the prior art is used, the output pattern in FIG. 6G is obtained.

It will be fully understood that the threshold rank matrix pattern of the present embodiment is much better than that of the prior art in reproducing efficiency, that is, resolution, in consideration of the examples above-mentioned.

EXAMPLE 2

In the following, there will be more particularly discussed a second embodiment of the present invention with reference to the drawings. In the embodiment to be discussed below, a laser beam printer is used as an image output device, and a reference matrix pattern is configured by (4×4) unit pixels and each unit pixel is divided into four fine pixels.

Since the basic configuration of a dither image signal output circuit, which is used in the present embodiment, is the same as shown in FIG. 2, the description thereof is omitted.

Figure 7A:
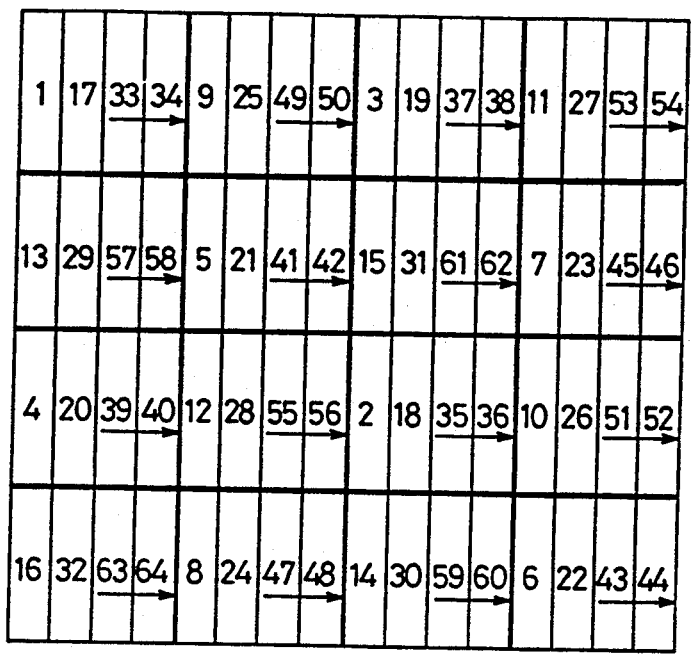
FIG. 7A is a view showing a threshold rank matrix pattern in accordance with one embodiment of the present invention.

FIG. 7A shows the state wherein threshold ranks, which are stored in the data ROMs 116, 117, 118 or 119 in FIG. 2, are collected under one matrix pattern. The matrix pattern of the threshold ranks in FIG. 7A corresponds to the reference matrix pattern configured by the (4×4=16) unit pixels.

Next, there will be discussed the features of threshold ranking in FIG. 7A. In the ranking above-mentioned, two fine pixels configuring the right half of each unit pixel are adapted to be serially grown. Namely, the threshold ranking is defined so that the two adjacent fine pixels marked by arrows may be serially grown as the gradations are heightened. The threshold ranks are distributedly assigned to the fine pixels other than the fine pixels above-mentioned.

In the ranking above-mentioned, when the two fine pixels of the unit pixel are kept on and the third fine pixel is turned on, the fourth fine pixel is serially turned on if the gradation is heightened by one. Therefore, even in case that the high gradations are reproduced, there are not more than two unit pixels, in which only one fine pixel is turned off in the reference matrix pattern. If only one fine pixel is turned off and other fine pixels are turned on in the unit pixel, there is a good possibility that the one fine pixel turned off will disappear due to bleeding of toner or the like in the printing output. In the present embodiment, two unit pixels or more, in which the possibly fine pixels are remained, cannot be formed and the gradations can be reproduced more precisely. Furthermore, the threshold ranks are distributedly assigned to the other fine pixels.

Figure 7B:
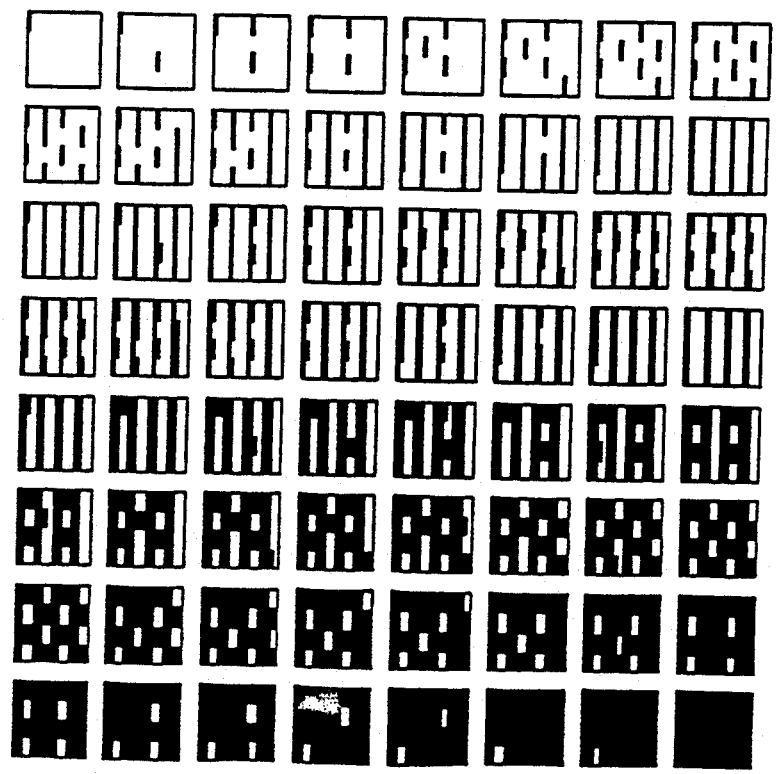
FIG. 7B is a view showing reproduction of 64 gradations in the case of using the pattern of FIG. 7A.

FIG. 7B shows the reproduction of 64 gradations represented on the basis of the threshold ranking pattern in FIG. 7A. The 1st to 32nd gradations of 64 gradation outputs are reproduced on the basis of the distributed threshold ranking. On the other hand, the 33rd to 64th gradations thereof are reproduced on the basis of the so-called centralized threshold ranking because two adjacent fine pixels are serially grown.

As a result of that, there is a good possibility that the white-area fine pixels which are turned off and have not been grown will be represented by the two adjacent fine pixels, while there is little possibility that the white areas may be invaded by the surrounding black areas, at the high density region. In other words, even if the bleeding or spreading of toner is more or less generated, the white areas do not disappear. Therefore, the gradations can be faithfully reproduced.

Figures 8A, 8B:
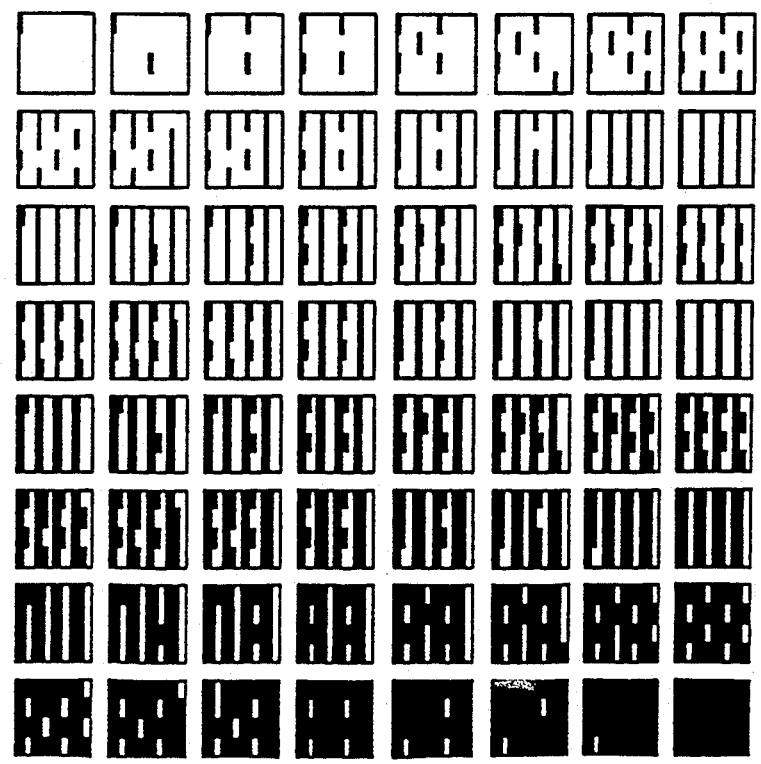
FIG. 8A is a typical distributed threshold rank matrix pattern in accordance with the prior art.
FIG. 8B is a view showing the reproduction of 64 gradations in the case of using the pattern of FIG. 8A.

For reference, FIG. 8A shows the conventionally typical distributed threshold ranking pattern, and FIG. 8B shows the reproduction of 64 gradations represented on the basis of the distributed pattern above-mentioned.

FIGS. 9A to 9D are views for explaining one of advantages in case of using the threshold rank matrix pattern shown in FIG. 7A, and, in particular, for explaining that the reproduced images are almost equivalent even if the positional relation between the original picture data and the matrix pattern is different.

In more detail, FIG. 9A shows one example of the positional relation between the original picture data and the matrix pattern, and FIG. 9B shows the reproduced image thereof. FIG. 9C shows that the positional relation between the original picture data and the matrix pattern is transversely shifted from that of FIG. 9A, and FIG. 9D shows the reproduced image thereof.

As apparent from FIGS. 9A to 9D, it will be understood that even if the positional relation between the original picture data and the matrix pattern is changed, the outputs are not largely changed, and the gradations can be reproduced more faithfully and the high resolution can be obtained for any image data.

The matter above-mentioned will be clearer, as compared with FIGS. 13A to 13D.

EMBODIMENT 3

Figure 10A:
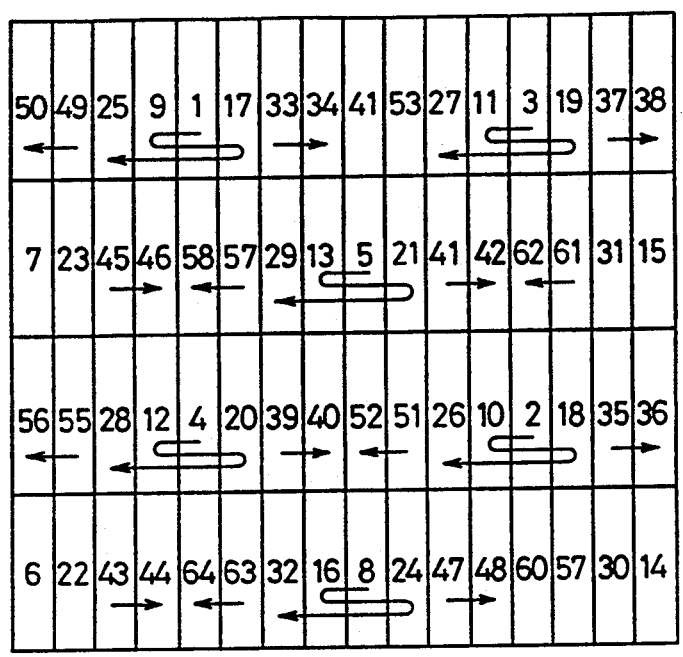
FIG. 10A is a view showing the threshold rank matrix pattern in accordance with another embodiment of the present invention.
Figure 10B:
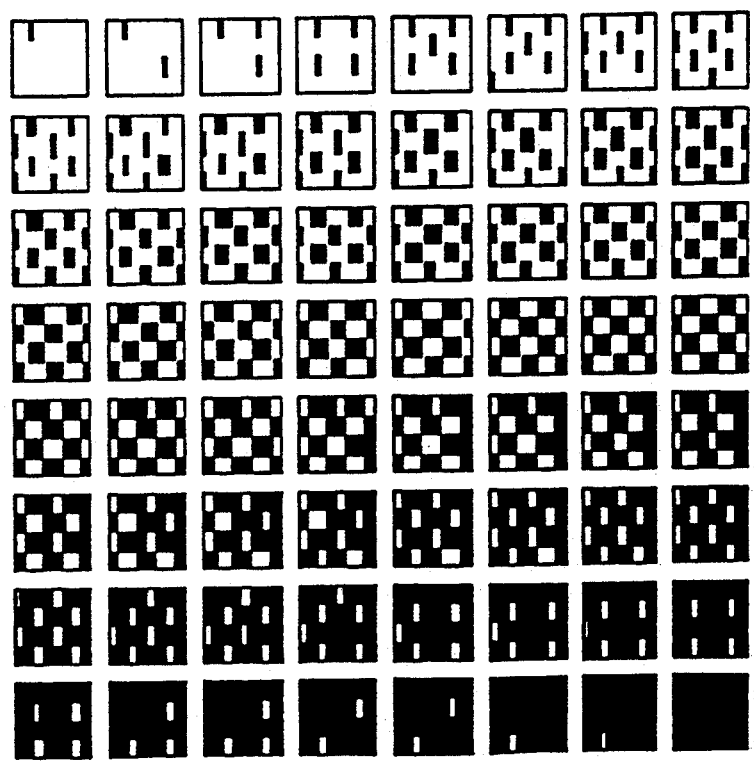
FIG. 10B is a view showing the reproduction of 64 gradations in the case of the pattern of FIG. 10A.
Figure 11:
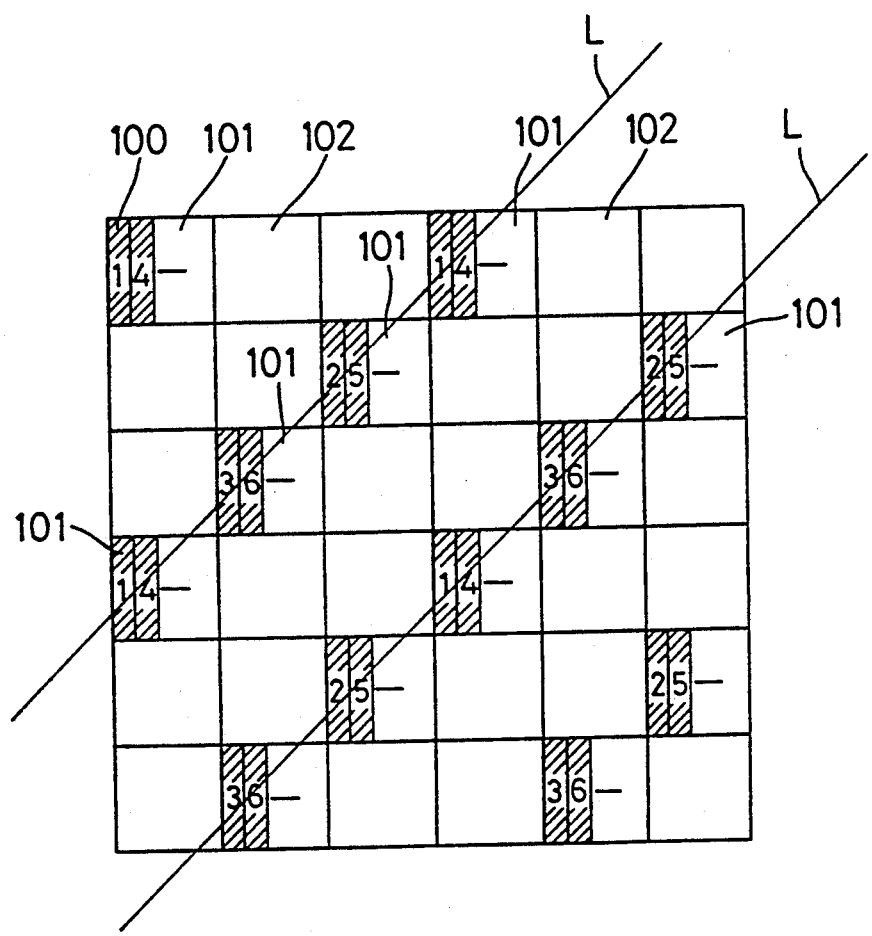
FIG. 11 is a view showing the directions of growth of the fine pixels in the prior art.
Figure 12A:
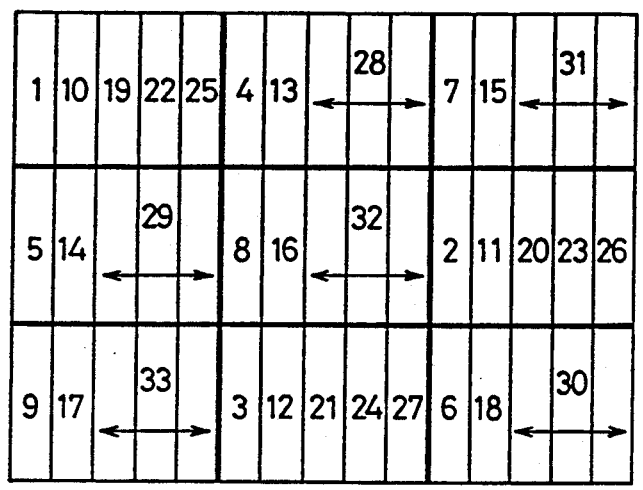
FIG. 12A is a view showing the threshold rank matrix pattern in accordance with the prior art.
Figure 12B:
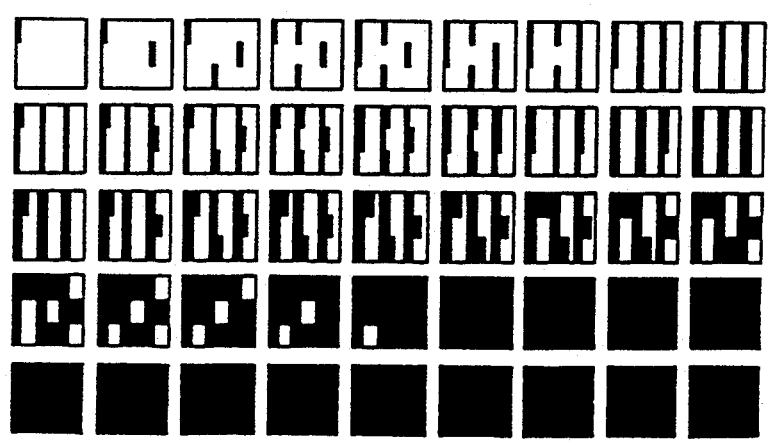
FIG. 12B is a view showing the reproduction of 45 gradations in the case of using the pattern of FIG. 12A.

FIG. 10A is a matrix pattern showing the threshold ranking in accordance with a particular embodiment of the first and second inventions, and FIG. 10B shows the reproduction of 64 gradations in the case of using the pattern of FIG. 10A.

In the present embodiment, the 1st to 32nd gradations are distributedly reproduced and the 33rd to 64th gradations are centrally reproduced.

The feature of the present invention is that two fine pixels, which configure the right or left half in each unit pixel, are adapted to be serially grown at the high gradation region, in similar to the embodiment of FIG. 7A. Namely, the threshold ranking is defined so that the two adjacent fine pixels marked by arrows may be serially grown as the gradations are heightened.

Figure 1:
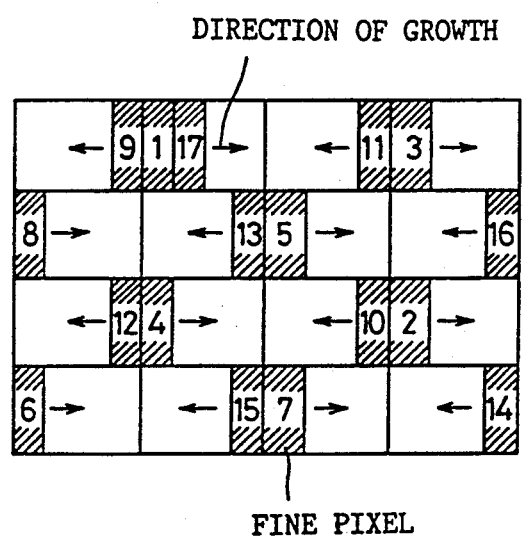
FIG. 1 is a view showing directions of growth of fine pixels in the present invention.

Another feature of the embodiment in FIG. 10A is that the threshold rank is assigned so that the fine pixels may not be linearly grown but squarely. Referring to the direction of growth of the fine pixels in the low gradation region, the same idea as in FIG. 1 is adopted. Namely, the threshold ranks are assigned in order of, for example, the fine pixel adjacent to the left side of the fine pixels "1" to "8" to become kernels, the fine pixel adjacent to the right side thereof, the fine pixel adjacent to the left side thereof, the fine pixel adjacent to the right side thereof and the like so that the growth of other fine pixels may be expanded toward right and left around the fine pixels to become the kernels. Accordingly, the fine pixels are not limited to one unit pixel but gradually grown over two unit pixels around the fine pixel to become the kernel.

According to the present embodiment, the gradations are faithfully reproduced and further the resolution is not damaged.

In the embodiments 1 to 3 above-mentioned, while the (4×4) reference matrix pattern has been discussed, the size thereof may be optional.

While the reproduction of gradation image information by the dither method has been discussed, the present invention can be also applied to the reproduction by a density pattern method.

Furthermore, the present invention can be used not only in a laser beam printer but in a liquid crystal printer, a LED printer and other image output devices.

It should be understood that various modifications can be made without departing from the scope of the invention.

What is claimed is:

1. A method of reproducing gradations according to an image signal wherein a reference matrix pattern is configured by arranging a plurality of unit pixels, each unit pixel being formed with a predetermined plurality of fine pixels, a number of the fine pixels being turned on according to the image signal so that the gradations are reproduced in accordance with a ratio of fine pixels turned on to fine pixels turned off in the reference matrix pattern, said method comprising the steps of:
   (a) alternately selecting every other unit pixel;
   (b) choosing, as kernels, the fine pixels at an end of each unit pixel thus selected in step (a), respectively;
   (c) turning on each kernel fine pixel in predetermined ranks according to a density indicated by the image signal; and
   (d) when all the kernel fine pixels are turned on in step (c), alternately turning on the fine pixels in the unit pixels selected in step (a) adjacent to the fine pixels already turned on, and turning on fine pixels in unit pixels not selected in step (a) adjacent to the fine pixels already turned on, in a predetermined rank according to the density indicated by the image signal.

2. A method according to claim 1, wherein the unit pixels selected from the reference matrix pattern have the fine pixels arranged therein.

3. A method according to claim 1, wherein the predetermined ranks to turn on the kernel fine pixels are distributionally assigned in the reference matrix pattern.

4. A method according to claim 1, wherein the predetermined ranks to alternately turn on the fine pixels adjacent to both sides of the fine pixels, which are turned on, according to the density indicated by the image signals are distributionally assigned in the reference matrix pattern.

5. In a method of reproducing gradations according to an image signal wherein a reference matrix pattern is configured by arranging a plurality of unit pixels, each unit pixel being formed with a predetermined plurality of fine pixels, a number of the fine pixels being turned on according to the image signal so that the gradations are reproduced in accordance with a ratio of fine pixels turned on to fine pixels turned off in the reference matrix pattern, said method including the steps of:

(a) selecting a plurality of fine pixels which are arranged in the reference matrix pattern;

(b) distributionally assigning ranks to turn on the fine pixels selected in step (a) within the reference matrix pattern at a region in which the image signal indicates as having low a density;

(c) dividing fine pixels not selected in step (a) into groups, each of the groups consisting of adjacent fine pixels;

(d) assigning ranks to turn on the groups selected in step (c) within the reference matrix pattern at a region which the image signal indicates has a high density, the improvement comprising a step of:

(e) turning on one of the groups defined in step (d) by serially, in succession, turning on adjacent fine pixels in said one group in accordance with the density indicated by the image signal until all the fine pixels in said one group are turned on.

6. A method according to claim 5, comprising a step of repeating step (e) for another group of adjacent fine pixels in accordance with ranks assigned in step (d).

* * * * *